United States Patent [19]

Taki et al.

[11] Patent Number: 4,600,460

[45] Date of Patent: Jul. 15, 1986

[54] PROCESS FOR FABRICATING DISPLAY PANEL

[75] Inventors: Hisao Taki; Takeo Iida, both of Tokyo, Japan

[73] Assignee: N K B Co., Ltd., Tokyo, Japan

[21] Appl. No.: 512,765

[22] Filed: Jul. 11, 1983

Related U.S. Application Data

[63] Continuation of Ser. No. 331,814, Dec. 17, 1981, abandoned.

[30] Foreign Application Priority Data

Dec. 19, 1980 [JP] Japan ............................ 55-178994

[51] Int. Cl.⁴ ...................... B32B 31/00; B44C 1/16; B41C 1/06; B41M 1/14

[52] U.S. Cl. ................................ 156/235; 156/154; 156/155; 156/240; 156/241; 156/247; 156/277; 156/310; 101/34; 101/211; 428/914

[58] Field of Search ................ 428/914, 200, 202, 38; 156/241, 240, 239, 249, 154, 236, 310, 344, 155, 247, 235, 277, 305, 267; 430/22; 101/41, 211, 33; 427/149

[56] References Cited

U.S. PATENT DOCUMENTS

| | | | |
|---|---|---|---|
| 100,881 | 3/1870 | Flammer | 156/241 |
| 1,952,310 | 3/1934 | Carstein | 428/38 |
| 2,115,409 | 4/1938 | Casto | 156/277 |
| 2,164,010 | 6/1939 | Grupe | 156/155 |
| 2,375,177 | 5/1945 | Reese | 156/241 |
| 4,105,483 | 8/1978 | Lin | 156/240 |
| 4,216,286 | 8/1980 | Greene et al. | 156/235 |
| 4,225,641 | 9/1980 | Yokomizo | 428/38 |
| 4,269,650 | 5/1981 | Arai et al. | 156/155 |
| 4,313,994 | 2/1982 | Kingston | 156/277 |

FOREIGN PATENT DOCUMENTS

| | | | |
|---|---|---|---|
| 0038681 | 10/1981 | European Pat. Off. | 428/38 |

*Primary Examiner*—Edward Kimlin
*Assistant Examiner*—L. Falasco
*Attorney, Agent, or Firm*—Wenderoth, Lind & Ponack

[57] ABSTRACT

A process for fabricating display panels in which which comprises printing one surface of a pulp paper with a plurality of printed image layers exactly overlaying and aligned with each other bonding; the image bearing surface of the pulp paper bonded to one surface of a panel base; and removing the pulp paper so that the display image is transferred to and remains on the panel base.

10 Claims, 5 Drawing Figures

PROCESS FOR FABRICATING DISPLAY PANEL

CROSS-REFERENCE TO RELATED APPLICATION

This is a continuation application of Ser. No. 331,814, filed Dec. 17, 1981, abandoned.

BACKGROUND OF THE INVENTION

1. Field of the Invention

The present invention relates to a process for fabricating in a simple manner display panels each of which can be displayed sharply and vividly and exhibits a higher degree of resistance against weathering.

2. Description of the Prior Art

In general, for the purpose of advertisement, many display panels having the same display pattern are fabricated at one time and in order to make them attractive, almost all of them use color photographs. In fabrication the photographic process has been widely used for printing a desired color picture or display image over the surfaces of panels, but the fabrication costs are high. In addition, such display panels are defective in that they are easily susceptible to weathering and consequently the color is faded therefrom. This fading effect is especially pronounced in display panels whose back is illuminated with a flood of light from fluorescent lamps or the like. Fading of display panels placed outdoor is very fast.

Furthermore, glass or acrylic resin sheets are normally used as the base of display panels, and printing over the surfaces of these arcylic sheets is difficult so that high-quality display images cannot be reproduced.

SUMMARY OF THE INVENTION

One of the objects of the present invention is therefore to provide a process for fabricating display panels which exhibit satisfactorily high resistance against both weathering and color fading.

Another object of the present invention is to provide a process for fabricating display panels which have sharply and vividly displayed images thereupon.

A further object of the present invention is to provide a process for fabricating display panels by a minimum number of simplified steps.

Briefly stated, to achieve the above and other ends, the present invention provides a process for fabricating display panels comprising reproducing over one surface of a sheet of pulp paper an image pattern consisting of a plurality of printed image layers exactly overlaid over and aligned with each other; a bonding step for bonding the ink-image bearing surface of the sheet of pulp paper to one surface of a panel base; and a pulp paper removal step for removing the sheet of pulp paper from the panel base so that the image pattern is transferred to and remains on the panel base.

Since a display panel fabricated by the process of the present invention bears an ink printed display image, it can exhibit a higher degree of resistance against weathering and color fading as compared to those fabricated by the conventional photographic process. According to one aspect of the present invention, the display-image bearing surface of the panel base is coated with a protective layer or film of polyester which prevents the transmission of ultraviolet rays so that the resistance against weathering can be further improved.

In addition, display panels fabricated according to the present invention can be vividly displayed in color and exhibit a higher degree of transparency as compared with those fabricated by the prior art photographic process.

According to the present invention, a display image printed over the surface of a sheet of pulp paper consists of a plurality of printed image layers which are correctly overlaid over and aligned with each other so that the density, contrast and tone of the display image can be optimamlly controlled, even when a conventional printing process is employed. At the present time, because of relatively low trapping, it is difficult to transfer an ink layer greater than 0.01 mm over the surface of printing paper or the like. In the case of display of a single printed image layer display image by the transmission of light, satisfactory density, contrast and other characteristics cannot be attained. However, according to the present invention, a display pattern consists of a plurality of printed image layers which are exactly overlaid over and aligned with each other so that the display image can be increased in thickness and consequently the high-quality representation can be ensured.

The process embodying the present invention can be automated in a simple manner and each fabrication step can be simplified because a printing process is employed. As a consequence, many display panels can be mass produced at less costs.

The above and other objects, effects and features of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
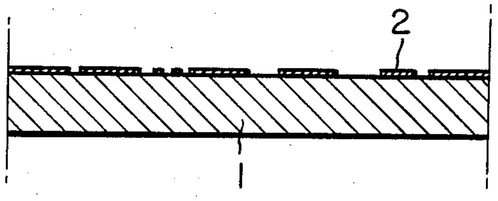
FIG. 1 is a fragmentary sectional view, on an enlarged scale, of a sheet of pulp paper upon which is deposited a first printed image layer.

Referring to FIG. 1, first an image pattern in the form of an inked image layer; that is, a printed image layer 2 is reproduced over one surface of a sheet of pulp paper 1 by the conventional planographic printing or gravure process. In the case of four-color process printing, four printing plates are used to reproduce the printed image layer 2 so that the latter consists of four patterns of different colors. The pulp paper 1 bearing the printed image layer 2 per se can be used as a display or a poster.

For the sake of clear and simple illustration, the surface of the printed image layer 2 is shown as being flat and uniform in thickness throughout the figures, but the thickness and the density of the printed image layer vary in practice. In the case of gravure process, the printed image layer 2 consists of many multicolor ink columns of extremely small diameters.

The same inked image is transferred over the printed image layer 2 in exact alignment therewith. To this end, the pulp paper 1 with the first printed image layer 2 is passed through the same printing press. In this case, even when an automatic feeding device is used, errors in misalignment between the first and second printed image layers are of the order of from a few tenths of one millimeter to a few hundredths of one millimeter. In the case of planographic printing, a small quantity of water is spread over the face of a printing plate so that printing paper is stretched to some extent. Therefore if a suitable time interval is selected between the first and second printing and a suitable humidity control is employed, the errors in alignment can be reduced to a negligible level. In cases of posters and window and showcase displayers which are large in size, such alignment or registration errors are almost negligible.

Figure 2:
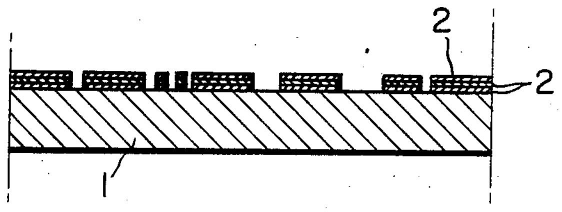
FIG. 2 is a view similar to FIG. 1 but shows three printed image layers which are overlaid and aligned exactly.

By repeating the printing with the same printing plate, a printed image consisting of a plurality of exactly overlaid and aligned printed image layers 2 can be deposited as shown in FIG. 2 (where three printed image layers 2 are shown).

Figure 3:
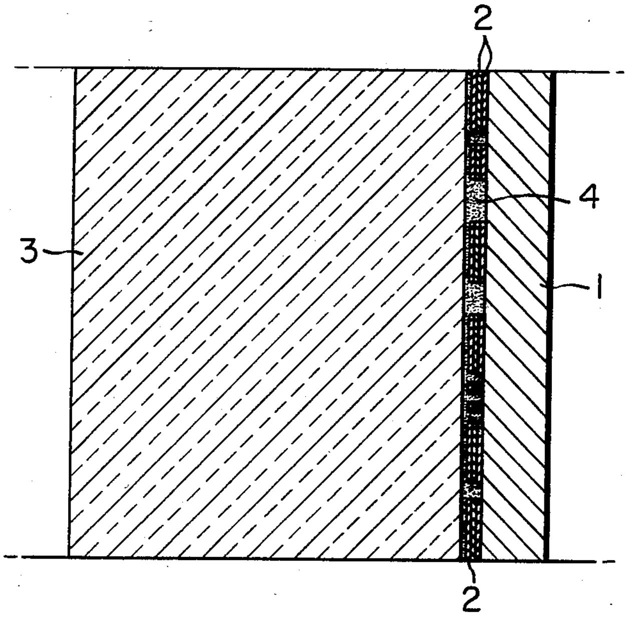
FIG. 3 is a fragmentary sectional view, on enlarged scale, of the sheet of pulp paper shown in FIG. 2 to a panel base.

Thereafter, as shown in FIG. 3, an adhesive 4 is uniformly applied over the image bearing surface of the pulp paper 1 or a surface of a transparent panel base 3 and the pulp paper 1 and the transparent panel base 3 are pressed against and securely joined to each other. The panel base 3 may be a sheet of acrylic resin or glass. In order to ensure uniform bond between the pulp paper 1 and the panel base 3, they may be passed between a pair of pressure rollers (not shown). Alternatively, a squeezer or the like can be applied to the nonprinting surface of the pulp paper 1 (on the right side in FIG. 3). It is preferable that the adhesive 4 exhibits chemical affinity to the ink on the pulp paper 1. For instance, it is preferable to use adhesives whose bases are vinyl resins.

Next a dilute solution of caustic soda is applied to the nonprinting surface of the pulp paper 1 which is now bonded to the panel base 3. Alternatively, the bonded assembly; that is, the pulp paper 1 and the panel base 3, is immersed into a bath containing a dilute solution of caustic soda. After the pulp paper 1 is sufficiently softened, it is removed from the base 3 with a brush or the like while spraying water over the pulp paper 1 so that removed paper tissues can be washed away as slurry and consequently the removal step can be much facilitated. In general, the printing ink is water repellant so that the printed image layer 2 can be prevented from being washed away or degraded.

Figure 4:
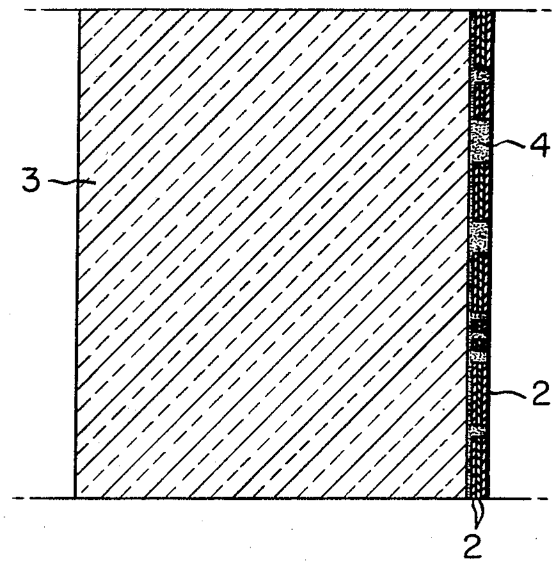
FIG. 4 is a fragmentary sectional view, on an enlarged scale, of a finished display panel.
Figure 5:
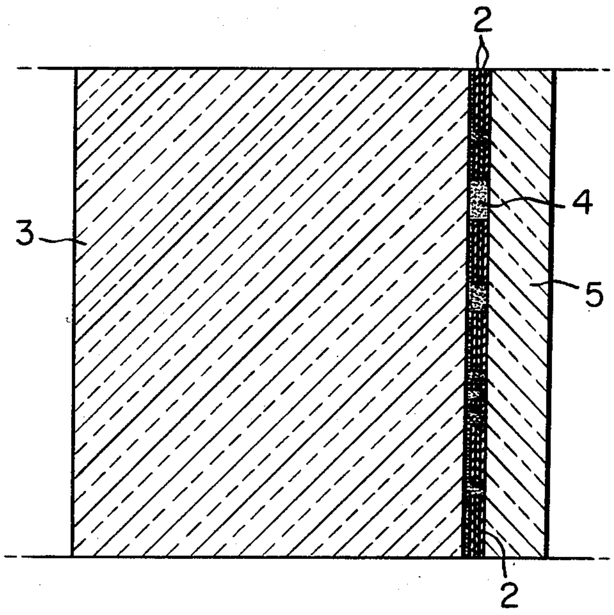
FIG. 5 is a fragmentary sectional view, on an enlarged scale, of a display panel with a protective layer which is also fabricated by a process embodying the present invention.

With the pulp paper 1 is removed in the manner described above, a transparent positive image defined by the printed ink is left on the transparent panel base 3 as shown in FIG. 4. In some cases, the transparent positive image is not satisfactory from the viewpoint of transparency. The reason is as follows: When the print ink is deposited directly over the surface of pulp paper 1 and the adhesive 4 is applied thereto, they penetrate into the pulp paper 1 to some depth and bind some pulp filaments. As a result, even after the pulp paper 1 has been washed away, the bound pulp filaments remain over the exposed surface of the display pattern, giving rise to minute surface irregularities. As a consequence, the surface has a diffused or unclean appearance in respect to the display pattern, which degrades the display effects. In this case, a clear agent, such as transparent lacquer, can be applied to the image bearing surface of the panel base 3 so that the image becomes completely transparent. Thus, the panel base 3 becomes like an extremely large-sized color slide and the resolution of the image is sufficiently comparable with high-quality posters or displays.

The display panel prepared in the manner described above can be used without any further processing, but according to another embodiment of the present invention, the image bearing surface of the display panel base 3 is coated with a transparent plastic protective layer 5, thereby protecting the printed image layer 2 from damage. The protective coating 5 is preferably white-milk in color and is made of a material exhibiting light diffusion when the display panel is used in combination with an illumination device without a diffusion plate. In this case, a flood of light from fluorescent lamps or the like can be projected directly over the back surface of the panel 3 so that light is transmitted through the display panel and consequently the display of the image can be enhanced. The display panel itself exhibits a high optical transmittance so that the image is by far brighter and clearer in color as compared with the case in which the back surface of a poster bearing an image printed by the conventional printing process is exposed to a flood of light for illumination. Especially areas in which the image has a metallic luster looks very vividly and real because of the transmission of light therethrough.

On the other hand, the display panel with or without the transparent protective coating 5 of the present invention must be displayed by an illumination device of the type having a diffusion type lighting panel or the like upon which is placed the display panel so that light is transmitted the whole area thereof.

What is claimed is:

1. A process for fabricating a transparent multicolored display panel comprising the steps of:

(a) printing a multicolor transparent image-pattern over one surface of a sheet of pulp paper by means of a multicolor printing press;

(b) printing said multicolor image pattern over the thus-printed surface for a sufficient number of times so as to build up a multiple stack of printed ink layers such that each color layer exactly overlays and is precisely aligned with the preceding layers so that each colored segment layer is the same in dimensions and color characteristics as the preceding layer to intensify each of the individual colors in the multiform image-pattern;

(c) bonding the multicolor image-pattern bearing surface of said sheet of pulp paper to one surface of a transparent panel base; and, (d) removing the said sheet of pulp paper so that the said image pattern is imposed on one surface of said transparent panel base.

2. A process according to claim 1 in which the pulp paper bearing the image-pattern bearing surface is bonded to the transparent base by uniformly applying an adhesive onto the image-pattern bearing surface of said sheet of pulp paper and pressing said sheet of pulp paper against said panel so as to bring them into firm contact with each other.

3. A process according to claim 1, in which the image-pattern bearing surface of the pulp paper is bonded to the panel by uniformly applying an adhesive over the surface of said transparent panel base and pressing the image-pattern bearing surface against the transparent base so that the transparent panel base is in firm contact with the surface of the pulp paper bearing the multicolor image pattern.

4. A process according to claim 2 in which the pulp paper is pressed against the transparent panel base by means of rollers.

5. A process according to claim 3 in which the transparent panel base is pressed against the pulp paper by means of rollers.

6. A process according to claim 2 in which the pulp paper is removed from the transparent panel base by means of a dilute solution of caustic soda, leaving the image pattern firmly affixed to the transparent panel base.

7. A process according to claim 3 in which the pulp is removed from the transparent panel surface by means of a dilute solution of caustic soda, leaving the image-pattern firmly affixed to the panel base.

8. A process according to claim 1 in which the transparent panel base is selected from the group consisting of acrylic resin or glass.

9. A process according to claim 1 in which a transparent protective layer is applied over the image-pattern bearing surface of said transparent panel base after removal of the pulp paper to protect the printed image layer from damage.

10. A process according to claim 1 in which a four-color process printing is employed using four printing plates each of different colors to produce a colored image layer having four different patterns of colors.

* * * * *